(12) United States Patent
Anand et al.

(10) Patent No.: US 9,146,743 B2
(45) Date of Patent: Sep. 29, 2015

(54) GENERALIZED BIT MANIPULATION INSTRUCTIONS FOR A COMPUTER PROCESSOR

(75) Inventors: Christopher K. Anand, Dundas (CA); Simon C. Broadhead, Dundas (CA); Robert F. Enenkel, Markham (CA)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 13/546,349

(22) Filed: Jul. 11, 2012

(65) Prior Publication Data
US 2014/0019719 A1    Jan. 16, 2014

(51) Int. Cl.
G06F 9/00 (2006.01)
G06F 9/30 (2006.01)
G06F 9/38 (2006.01)

(52) U.S. Cl.
CPC ........ *G06F 9/30181* (2013.01); *G06F 9/30018* (2013.01); *G06F 9/30032* (2013.01); *G06F 9/30167* (2013.01); *G06F 9/3887* (2013.01)

(58) Field of Classification Search
CPC .......................... G06F 9/30018; G06F 9/30032
See application file for complete search history.

(56) References Cited

U.S. PATENT DOCUMENTS

| | | | |
|---|---|---|---|
| 5,648,924 A | 7/1997 | Smith | |
| 6,675,292 B2 | 1/2004 | Prabhu et al. | |
| 6,973,469 B1 | 12/2005 | Hsu et al. | |
| 2005/0198474 A1 * | 9/2005 | Nancekievill et al. | 712/223 |
| 2006/0106909 A1 | 5/2006 | Howard | |
| 2009/0037504 A1 | 2/2009 | Hussain | |
| 2009/0177869 A1 | 7/2009 | Novichkov et al. | |

OTHER PUBLICATIONS

Bartolini, Sandro, et al., "Instruction Set Extensions for Cryptographic Applications," 2009, p. 8, Dipartimento di Ingegneria dell'Informazione, Universit'a di Siena, Italy.
"Optimizing Loops on the C66X DSP," Nov. 2010, p. 4, High-Performance and Multicore Processors, Application Report—Texas Instruments.
Hamburg, Mike, "Accelerating AES with Vector Permute Instructions," Sep. 7, 2009, p. 1, Computer Science Department, Stanford University, USA.

* cited by examiner

*Primary Examiner* — Zachary K Huson
(74) *Attorney, Agent, or Firm* — Nelson and Nelson; Daniel P. Nelson; Alexis V. Nelson

(57) ABSTRACT

Methods of bit manipulation within a computer processor are disclosed. Improved flexibility in bit manipulation proves helpful in computing elementary functions critical to the performance of many programs and for other applications. In one embodiment, a unit of input data is shifted/rotated and multiple non-contiguous bit fields from the unit of input data are inserted in an output register. In another embodiment, one of two units of input data is optionally shifted or rotated, the two units of input data are partitioned into a plurality of bit fields, bitwise operations are performed on each bit field, and pairs of bit fields are combined with either an AND or an OR bitwise operation. Embodiments are also disclosed to simultaneously perform these processes on multiple units and pairs of units of input data in a Single Input, Multiple Data processing environment capable of performing logical operations on floating point data.

11 Claims, 11 Drawing Sheets

GENERALIZED BIT MANIPULATION INSTRUCTIONS FOR A COMPUTER PROCESSOR

BACKGROUND

1. Field of the Invention

This invention relates to instruction set architectures for computer processors. More particularly, the invention relates to generalized bit manipulation instructions.

2. Background of the Invention

Many computer applications rely on the computation of certain elementary mathematical functions. Examples of such functions include square root functions, logarithm functions, exponential functions, and so forth. Certain applications, such as numerical applications, high performance computing applications, scientific computing applications, and financial applications are particularly reliant on the computation of elementary functions to the point that the efficiency with which such functions are evaluated significantly impacts the overall performance of such applications.

A great deal of effort is dedicated to optimizing computation of elementary functions. Two important techniques for the optimization of such computations include the use of piecewise polynomial approximations and bit manipulation. Bit manipulation can be used to facilitate such approximations, as described below.

In the piecewise polynomial approximation technique, a number of polynomials are defined. Each defined polynomial approximates the target function, which may be an elementary function, accurately over a specific interval. Coefficients for these polynomials are stored in a table, along with other values used in the approximation.

To access the relevant polynomial coefficients from the table, a key is generated. To select the appropriate polynomial coefficients corresponding to the appropriate interval, the key is produced by extracting and/or manipulating bits from the argument, or an intermediate value computed from the argument. The argument or other value from which the key is computed is typically a floating point value, whose bits are typically a combination of a subset of the sign, exponent and fraction bits. Therefore, the ability to efficiently manipulate argument bits is essential to the efficient calculation of performance critical elementary functions.

By use of a piecewise polynomial approximation technique based on bit manipulation, high performance computing applications that repetitively rely on elementary function can be efficiently implemented. In addition to the use of bit manipulation in forming table-lookup keys, bit manipulation also can be used in other ways, such as copying a sign bit, or moving exponent bits to the fraction bits of a floating-point number to calculate an approximate base-2 logarithm. Additionally, bit manipulation is also important for applications such as encryption, databases (packing fields), compression, video/audio encoding/decoding, and spline interpolation. The ability to manipulate bits is also important to other processes in rendering, computer graphics, and calculating hash functions.

Often high-throughput applications, including applications that rely heavily on elementary functions, also rely on parallel computing such as Single Instruction, Multiple Data (SIMD) for optimum performance. However, instruction set architectures do not presently support instructions for the kind of bit manipulations necessary to manipulate bits for the purposes of elementary function calculation as efficiently as they could. Furthermore, currently existing instructions, such as the Rotate Left Word Immediate then Mask Insert (rlwimi) of the POWER instruction set architecture, which is not supported for SIMD or floating point data, are not sufficiently general. As a result, multiple operations must often be performed to manipulate bits as required for elementary function calculation. Therefore, additional instructions need to be defined that are capable of bit manipulation with greater generality and which are supported for SIMD and which support floating point data.

SUMMARY

The present invention has been developed in response to the present state of the art and, in particular, in response to the problems and needs in the art that have not yet been fully solved by currently available technologies. Accordingly, the invention has been developed to more efficiently manipulate bits within computer processors, including computer processors with parallel processing capabilities, such as SIMD capabilities, and which can perform logical operations on floating point data. The features and advantages of the invention will become more fully apparent from the following description and appended claims, or may be learned by practice of the invention as set forth hereinafter.

Consistent with the foregoing, a method for bit manipulation within a computer processor is disclosed herein. In one embodiment, the method involves provisioning input data for processing in a computer processor with control data. In certain embodiments, this may be accomplished by an input module. Control data may be provisioned by a data provisioning module.

The control data may carry instructions for selecting the input data. Furthermore, the control data may provide information to partition the input data into a plurality of bit fields, where a length of each bit field is determined based on a capability of each bit in the bit field to be manipulated according to a common manipulation rule to achieve a particular result. The control data also provides information about how to manipulate the input data in accordance with one or more manipulation rules to accomplish the particular result, such as, without limitation, operations involved in the computation of an elementary function or the generation of a lookup key. According to these instructions, the input data is partitioned into the plurality of bit fields and manipulated according to the control data to achieve the particular result. These operations may be accomplished by an implementation module, as well as additional operations discussed below.

Additional embodiments store a vector of units of input data for parallel processing in a SIMD processor. The control data is implemented on the vector of units of input data to accomplish the partitioning and the manipulating steps on units of input data. In some embodiments, multiple data sets are generated within the control data. One of these data sets is allocated to partition a particular unit of input data, and another data set is allocated to manipulate resultant bit fields of the particular unit of input data in a manner uncoupled from how remaining units of input data from other units of input data are partitioned and manipulated.

In certain embodiments, mask information is included with the control data constituting manipulation rules configured to insert non-contiguous bit fields of at least one unit of input data stored into at least one output register. The mask information is also configured to leave bits not replaced unaltered. Such embodiments may also include at least one shift parameter (The term may shift parameter may also refer to a parameter with information need to perform a rotate operation) with the control data. Such shift parameters define a number of positions by which bits from one or more units of input data are shifted to one side before masking.

In alternative embodiments, a first set of bits is read within the processor. In certain embodiments, this may be accomplished with a partition module. The bits are provided with the control data encoded with information as to where to partition a first unit of input data and a second unit of input data into equally spaced bit fields.

A selection is made for a bitwise operation constituting a manipulation rule from a set of bitwise operations for each bit field based on a second set of bits provided with the control data encoded. This may be accomplished by a selection module. A pair of bit fields is combined from the first unit of input data with a bit field from the second unit of input data with either an AND operation or an OR operation based on a combination selection encoded in a third set of bits provided with the control data. This may be accomplished by a combination module.

In some embodiments, the set of bitwise operations may include a first bitwise operation that preserves bits unchanged in a bit field, a second bitwise operation that performs a NOT operation on bits in a bit field, a third bitwise operation that ensures every bit has a value of zero, and a fourth bitwise operation that ensures every bit has a value of one. In certain embodiments, the second set of bits and/or the third set of bits differ with respect to the first unit of input data and the second unit of input data. Also, in some embodiments, the control data is implemented on multiple pairs of a first unit of input data and a second unit of input data to produce multiple units of output for multiple output registers concurrently in a single instruction multiple data processor.

Certain embodiments involve a computer program product for bit manipulation, embodying a computer code compiler, configured to compile programs written in one or more programming languages requiring compiling for implementation on a processor. The compiler identifies portions of code, the processing of which could be done more efficiently through bit manipulation. The compiler also determines partition points for units of input data to be processed by bit manipulation. Units of input data are to be partitioned into a plurality of bit fields, where a length of a bit field is determined based on a capability of each bit in the bit field to be manipulated according to a common manipulation rule to achieve a particular result. The compiler also determines manipulation rules for the plurality of bit fields in accordance with at least one manipulation rule to accomplish the particular result.

In certain embodiments, the compiler provisions masking information derived from the manipulation rules, where the masking information is configured to insert non-contiguous bit fields of units of input data stored in input registers into output registers and configured to leave bits not replaced unaltered. In such embodiments, the compiler may also provision shift parameter information derived from the manipulation rules, wherein a shift parameter defines a number of positions by which bits from the input data are shifted to one side before masking.

In alternative embodiments, the compiler provisions bitwise operations derived from the manipulation rules. The bitwise operations are selected to be performed on various bit fields. The compiler may also provision combination selections derived from the manipulation rules, where the combination selections are configured to indicate one of an AND operation and an OR operation with which to combine pairs of bit fields from two units of input data.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
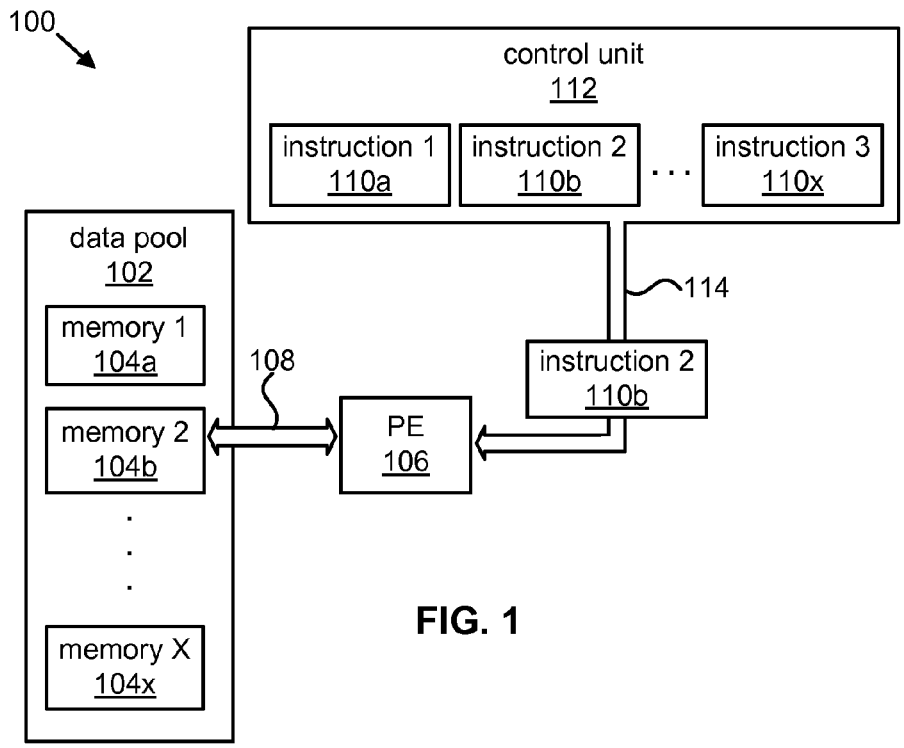
FIG. 1 is a high-level block diagram showing one type of processing architecture consistent with an environment in which the present invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java™, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one embodiment of a Single Input, Single Data (SISD) processing architecture 100 is depicted, consistent with an environment in which certain embodiments of the present invention may be implemented. The SISD processing architecture 100 includes a data pool 102 with multiple memory cells 104a-104x, each memory cell 104 capable of storing a unit of input data for processing. A unit of data may be equal to the size of a word for which the processor architecture is configured, such as, without limitation 16 bits, 32 bits, or 64 bits, but need not necessarily be defined in this way. A unit of data may also comprise any one of different data types including, without limitation, integer, Boolean, character, and floating point.

A unit of data is selected from a memory cell 104b for processing in a processing element 106, which may comprise a logic and/or arithmetic processor or a portion thereof. The unit of data may reside, for example, in main memory, in a processor cache, or in a processor register, such as a general purpose register. The unit of data is communicated over a memory bus 108 to the processing element 106.

The unit of data may be selected by control data in the instruction 110b provisioned by the control unit 112, from a set of potential instructions 110a-110x. The set of potential instructions 110a-110x may be defined by an Instruction Set Architecture (ISA). By way of illustration, but without providing a comprehensive list, such ISAs may include various versions of x86, x86-64, MISD and POWER ISAs. The ISAs may also include extensions, such as x87 for floating point units of data, to extend the capabilities of the ISAs. Extensions for floating point units may access the processing capabilities of a Floating Point Unit (FPU) within the processor to perform operations on floating point data. Unfortunately, ISA extensions for floating point and FPUs often focus on arithmetic operations such as, addition, subtraction, multiplication, division, and square root, to the exclusion of logical operations, which are used in bit manipulation.

Certain bits reserved for an operand in the control data of the instruction 110b may be used to locate and select the memory cell 104b in which the unit of data resides. The instruction 110b also carries directions encoded in other bits for processing the unit of data in the processing element 106. The instruction is accessed over a control bus 114.

Figure 2:
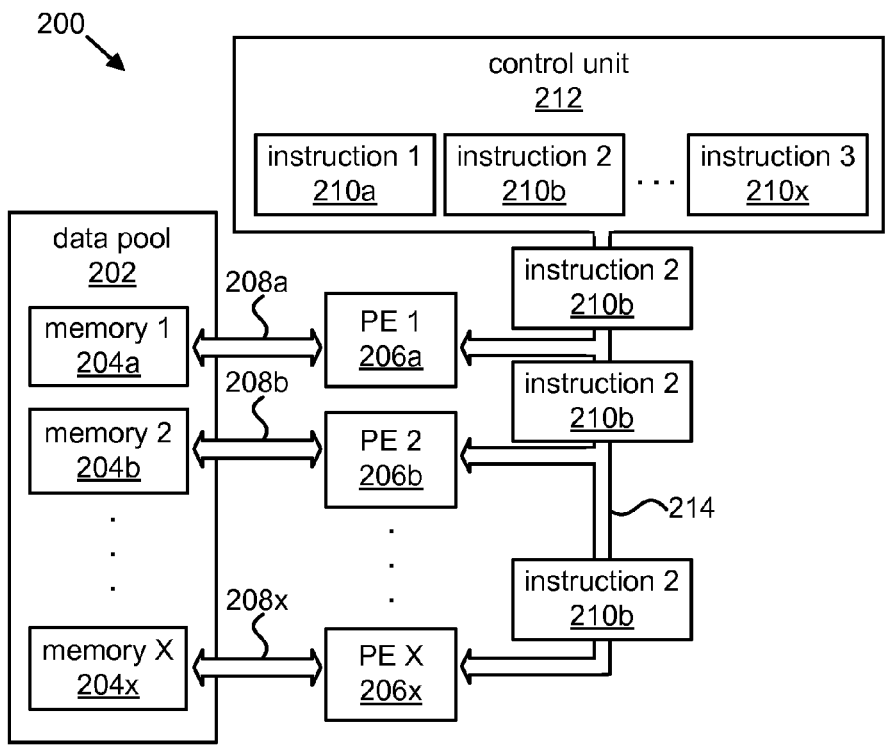
FIG. 2 is a high-level block diagram showing another type of processing architecture consistent with another environment in which the present invention may be implemented.

Referring to FIG. 2, one embodiment of a Single Input, Multiple Data (SIMD) processing architecture 200 is depicted, consistent with an environment in which certain embodiments of the present invention may be implemented. A SIMD processing architecture 200 facilitates parallel, simultaneous/contemporaneous processing of multiple units of input data, which may comprise a vector of units of input data. SIMD processors are commonly used for processing graphics, video, audio, and multimedia and are becoming increasingly common for handling general computing needs. They are particularly well suited to applications that rely on the computation of a large number of elementary functions. SIMD processors typically range from 2 to 16 units of data that they can process simultaneously, with processors capable of processing 4 units of data simultaneously being particularly common at the time of this disclosure.

FIG. 2 depicts a data pool 202 with multiple memory units 204a-204x, each configured to store a unit of input data. Unlike the SISD processing architecture 100, however, multiple units of input data from multiple memory units 204a-204x are provisioned simultaneously on components 208a-208x of a memory bus to multiple processing elements 206a-206x. Conversely, as with the SISD scenario, only a single instruction 210b is provisioned by the control unit 212 from a set of potential instructions 210a-210x on a control bus 214.

The single instruction 210b is provisioned to each processing element 206a-206x. The multiple processing elements 206a-206x may comprise processor elements that would otherwise remain inactive and unutilized in a SISD scenario. The control data of the single instruction 210b may be configured to select the various units of input data to provision to the processing elements 206a-206x. Instruction technologies such as Very Long Instruction Word (VLIW) may be used to achieve this result.

In embodiments employing technologies such as VLIW, decisions about parallelization may be made at the software level in a compiler as opposed to being made by additional hardware added to the processor, as is done in pipelining and out-of-order execution approaches in superscalar architectures. However, embodiments involving a compiler are consistent with the processing architectures described in association with FIGS. 1 through 3.

The compiler may identify portions of code from a program that would more efficiently be processed in parallel and/or through bit manipulation. The compiler may also determine partition points for units of input data resulting in bit fields to be processed by bit manipulation according to a common manipulation rule to achieve a particular result. The compiler may also determine manipulation rules for multiple bit fields in accordance with at least one manipulation rule to accomplish the particular result.

In certain embodiments, the compiler provisions masking information derived from the manipulation rules configured to insert non-contiguous bit fields of units of input data stored in input registers into output registers. In such embodiments, the compiler may also provision shift parameter information which defines a number of positions by which bits from the input data are shifted to one side before masking. In alternative embodiments, the compiler provisions selections of bitwise operations derived from the manipulation rules. The compiler may also provision combination selections derived from the manipulation rules, wherein the combination selections are configured to indicate either an AND operation or an OR operation with which to combine pairs of bit fields from two units of input data.

Returning to the instruction 210b, the same instruction 210b contains the directions employed by multiple processing elements 206a-206x to simultaneously process the multiple units of input data in the same way, dramatically improving the speed of the processor. As appreciated, the number of any of the components depicted in FIG. 2 can vary from the numbers depicted.

As with floating point operations, SIMD approaches have required ISA extensions such as the various versions of the Streaming SIMD Extensions (SSE), Advanced Vector Extensions (AVE), and ALTIVEC. Such extension sets typically accommodate larger instructions and larger registers, such as registers of 128 bits. SIMD ISAs can increasingly be used on floating point data and can accommodate both arithmetic and logical operations.

Figure 3:
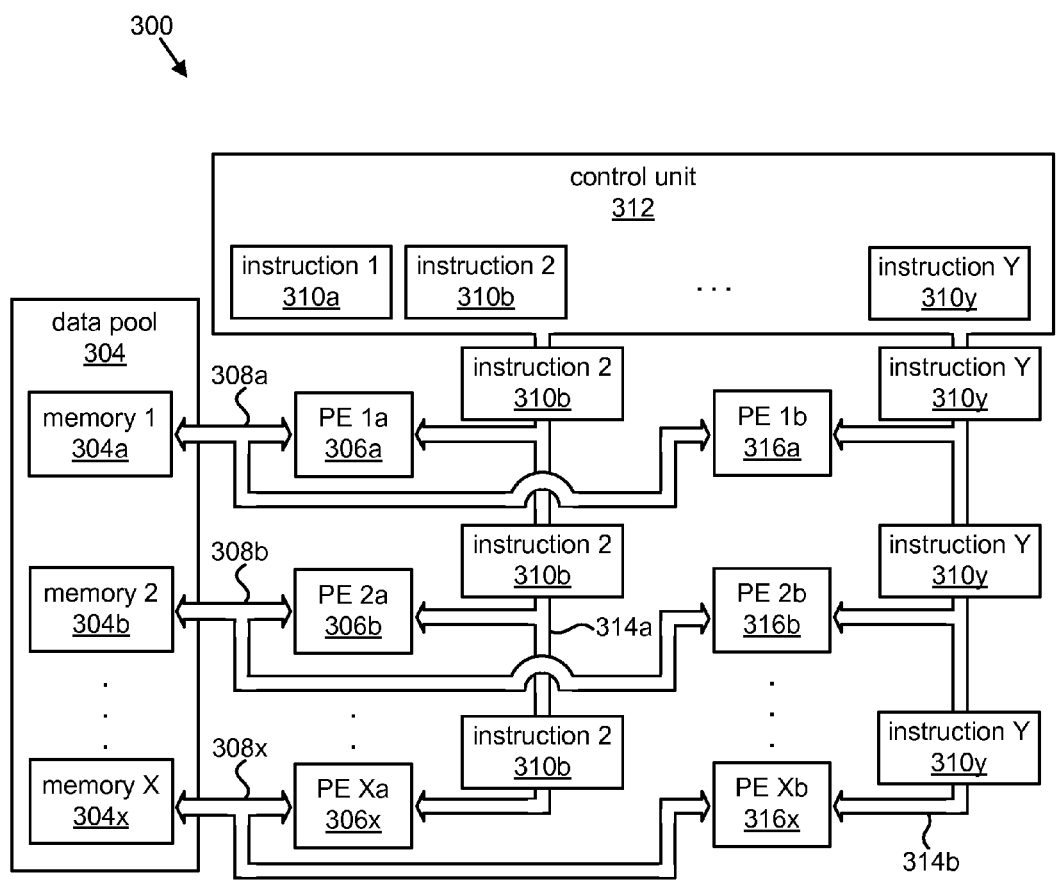
FIG. 3 is a high-level block diagram showing yet another type of processing architecture consistent with another environment in which the present invention may be implemented.

Referring to FIG. 3, a Multiple Input, Multiple Data (MIMD) processing architecture 300 is depicted, consistent with an environment in which certain embodiments of the present invention may be implemented. As with other processing environments, the environment depicted in FIG. 3 has a data pool 302 with multiple memory units 304a-304x, each configured to store a unit of input data. Similar to the SIMD scenario, multiple units of input data from multiple memory units 304a-304x are provisioned simultaneously on components 308a-308x of a memory bus to multiple processing elements 306a-306x.

Unlike both the SISD and SIMD scenarios, multiple instructions 310b, 310y are provisioned from a set of possible instructions 310a-310y by a control unit 312 over different portions of a control bus 314a, 314b. The first instruction 310b is provisioned to a first set of processing elements 306a-306x to perform one or more operations on the units of input data via a first component of the control bus 314a. Another instruction 310y is communicated via another component of the control bus 314b to a second set of processing elements 316a-316x to perform one or more different operations on the units of input data. As appreciated, the number of any of the components depicted in FIG. 3 can vary from the numbers depicted.

MIMD environments can also employ technologies like VLIW. An increasingly common example of such an environment results from processor architectures with multiple cores. In such environments, one or more cores may be configured for SIMD processing, which, in the aggregate results in MIMD processing.

To improve the performance critical task of computing elementary functions, and for other potential applications, it is essential that the processing elements depicted in FIGS. 1 through 3 be enabled with instructions that increase the generality with which bits can be manipulated. As discussed, elementary functions can often be calculated more quickly with the help of bit manipulation. One example in which bit manipulation can be of assistance is in terms of generating a look up key to access coefficients and other data corresponding to a polynomial used in a piecewise polynomial approximation for a given elementary function.

Figure 4:
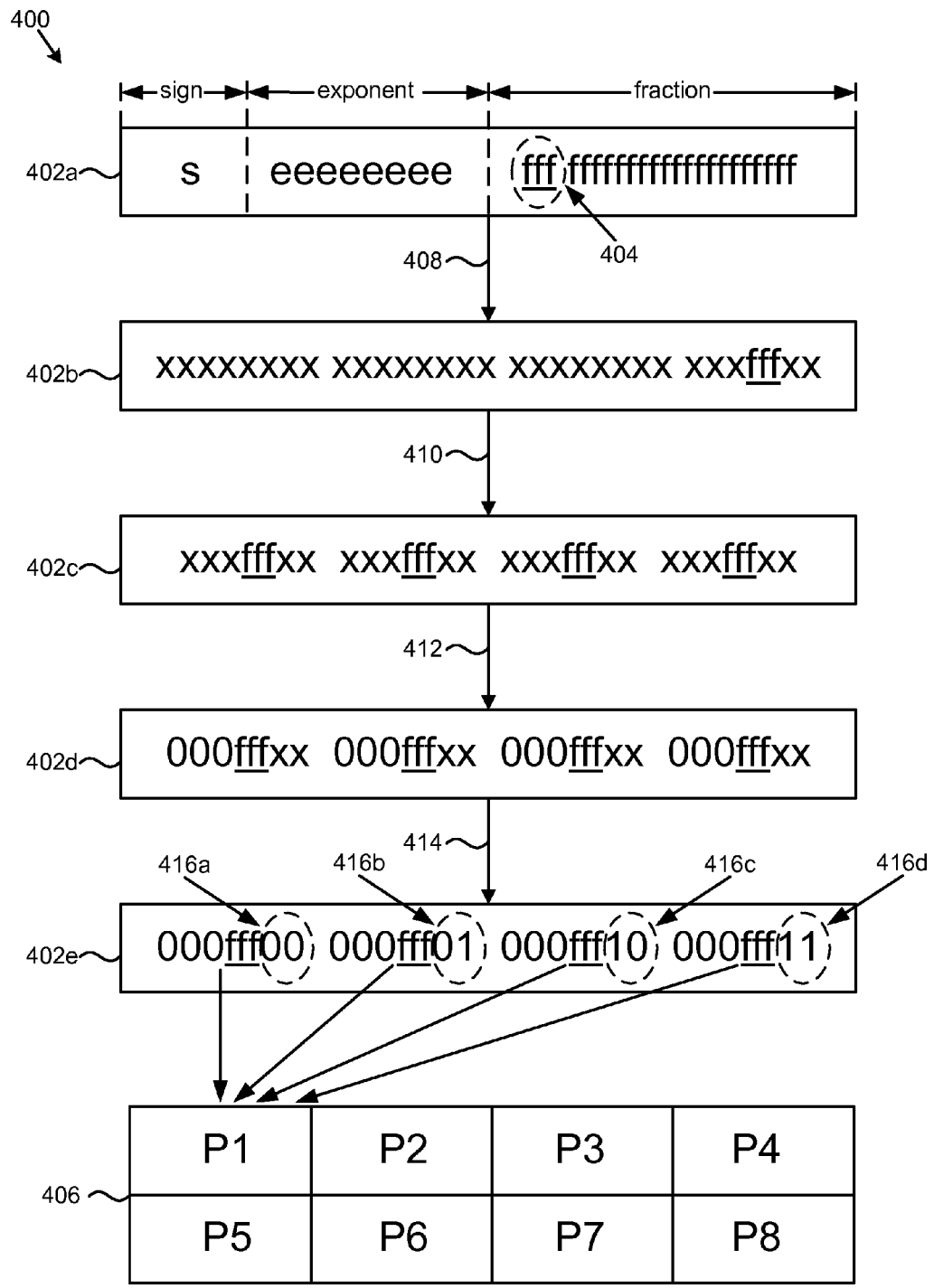
FIG. 4 is a high-level block diagram showing a process of bit manipulation previously implemented to access polynomial coefficients for a piecewise polynomial approximation of an elementary function.

Referring to FIG. 4, an example is depicted of one scenario 400 for bit manipulation in a SIMD environment on an input argument to access coefficients for a polynomial approximation of an elementary function showing why increased flexibility and generality would result in improvements. An input unit of data is depicted corresponding to an input argument 402a. The input argument 402a comprises floating point data and can be divided into different regions corresponding to a region corresponding to a sign bit, a region corresponding to exponent bits, and a region corresponding to fraction bits.

Floating point data is commonly encountered as the form of data making up the argument for calculations of elementary functions. For purposes of illustration, the example uses a 32 bit word for the argument 402a, but other word sizes are possible and are to be expected in certain embodiments. In the 32 bit argument 402a, the first three most significant bits of the fraction region 404 may be used for the scenario 400 to determine which of 8 polynomials in the polynomial table 406 are to be used for purposes of elementary function calculation. Also, because applications that rely heavily on the computation of elementary functions lend themselves to parallel computing, and SIMD, the scenario 400 is tailored to a SIMD environment. The operations shown in FIG. 4 are those corresponding to a single SIMD slot. Corresponding operations may be performed in the other slots.

A first processing step 408 is performed on the argument 402a to produce a first result 402b. The first step 408 may require multiple operations and potentially more than one instruction. The first step 408 comprises rotating the data in the argument 402a so that the three most significant bits 404 occupy positions beginning two bits from the least significant bit location. This first result 402b places the three most significant bits 404 fully with one of four bytes, or octets, of data.

A second processing step 410 is then performed on the first result 402b to produce a second result 402c. As before, the second step 410 may require multiple operations and potentially more than one instruction. The second step 410 comprises shuffling and replicating the three most significant bits 404 so that a copy occupies the same position occupied by the three most significant bits 404 in the first octet in the first result 402b. After the second step 410, four separate calls to a polynomial in the table of polynomials 406 are embedded in the four octets.

A third processing step 412 is then performed on the second result 402c to produce a third result 402d, which may also require multiple operations and potentially more than one instruction. The third step 412 comprises changing the first three bits in each octet to zeros. A fourth processing step 414 is then performed on the third result 402d to produce a fourth result 402e, which may also require multiple operations and potentially more than one instruction.

The fourth processing step 414 comprises changing the last two bits of each tag to create four sequential indices 416a-416d capable of indexing each octet. The data in result four 402e allows the polynomial coefficients for the first polynomial in the table of eight polynomials 406, which correspond to the three most significant bits 404 copied to each octet, to be accessed four times to calculate four elementary functions simultaneously in a SIMD environment, where elements of calculations can be indexed by sequential indices 416a-416d.

Not only does the process in FIG. 4 involve four different steps 408, 410, 412, 414, but each step may require more than one instruction. Instructions with greater flexibility to manipulate more bits in more ways may result in fewer steps and overall instructions, leading to more efficient processing. Unfortunately, instructions for such formulas do not presently exist.

Figure 5:
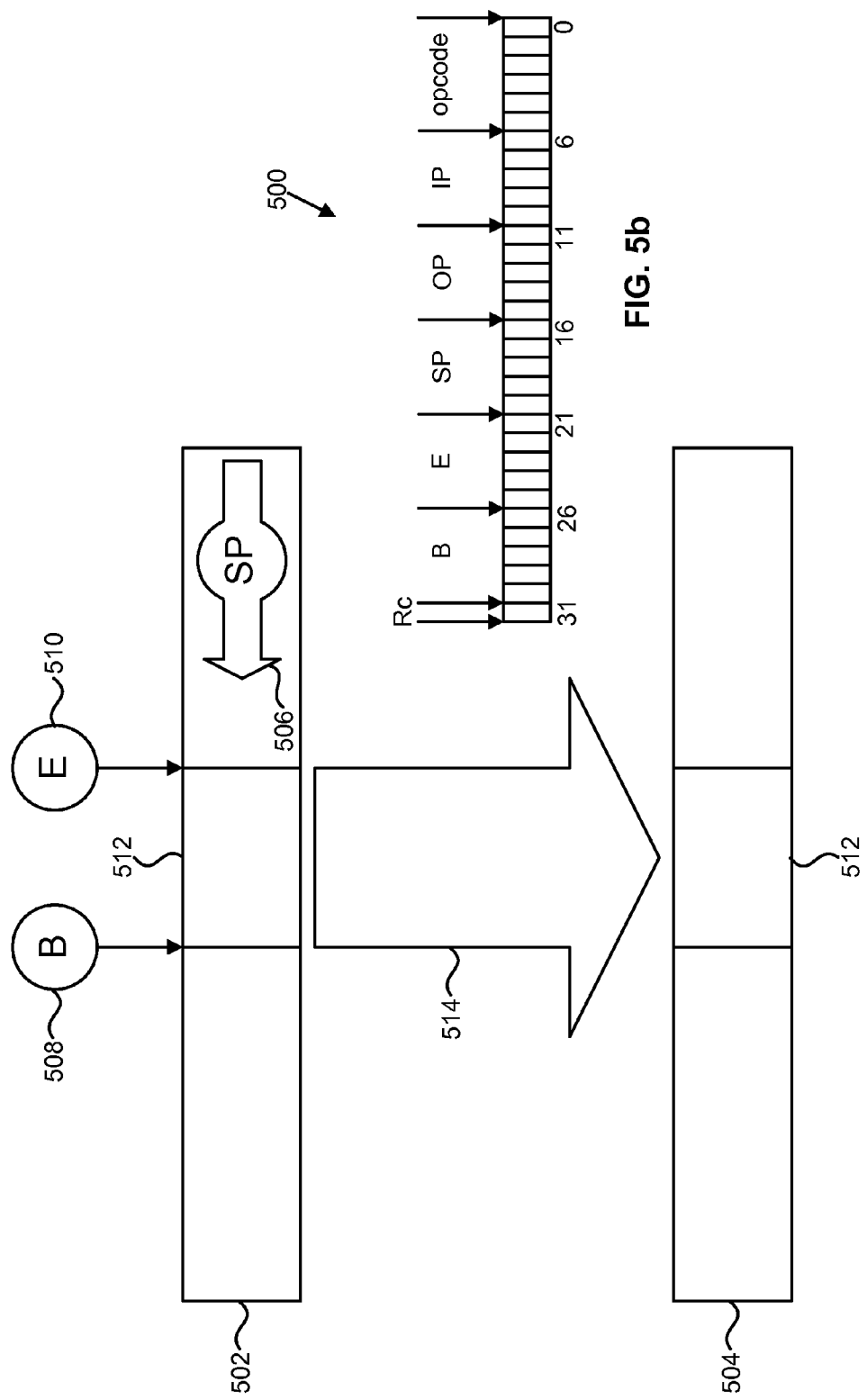
FIG. 5a is a high-level block diagram showing the implementation of the Rotate Left Word Immediate then Mask Insert (rlwimi) instruction from the POWER ISA.
FIG. 5b is a high-level block diagram showing bit allocation for a Rotate Left Word Immediate then Mask Insert (rlwimi) instruction from the POWER ISA.

Referring to FIG. 5a, a block level diagram of an implementation of the Rotate Left Word Immediate Then Mask Insert (rlwimi) instruction provided in the POWER ISA is depicted. The rlwimi instruction illustrates a degree of generality and flexibility presently allowed by ISAs. In FIG. 5a, a unit of input data 502 is depicted together with a unit of output data 504. The unit of input data 502 and the unit of output data 504 may reside in separate general purpose registers within a processor.

The rlwimi instruction provides a shift parameter SP 506 that indicates how far to shift/rotate bits from the unit of input data to the left. Also included in the rlwimi instruction are a first partition locator 508 and a second partition locator 510. The first partition locator 508 and the second partition locator 510 define a bit field 512 for insertion 514 into the unit of output data 504. The bit field 512 is inserted 514 to occupy the same position it did in the unit of input data in the output data 504 by means of a masking operation. Bit fields in the output register 504 to either side of the inserted bit field 512 remain unchanged.

While the rlwimi instruction may provide certain levels of generality and be useful in bit manipulation, even in assisting in some of the steps 408, 410, 412, 414 discussed with respect to the scenario 400 of FIG. 4, there are significant limitations. For example, the rlwimi instruction is not designed for floating point data. Also, SIMD is not supported by the rlwimi instruction. Furthermore, the generality of bit manipulation is limited to a bit shift/rotation 506 and the insertion 514 of a single bit field 512.

Referring to FIG. 5b, encoding of an rlwimi instruction 500 is explained. The first 6 bits, from position 0 to position 5, provide the opcode, which lets a processing element know that this is an rlwimi instruction 500. The next five bits, from position 6 to position 10, provide the address for the unit of input data 502. A block of 5 bits are used because 32 register locations are generally available, and $2^5=32$.

The next five bits give the location of the unit of output data 504 in another register. Similar 5 bit blocks are reserved for a shift parameter 506, a first partition locator 508, and a second partition locator 510 for bit positions 16 to 20, 21 to 25, and 26 to 30, respectively. Each of these parameters is given a 5 bit block because of the 32 different positions which the input data can be shifted/rotated or in which either of the partition locators 508, 510 can be placed. The final bit position, position 31, is reserved as a record bit for purposes of setting a condition register.

As appreciated, all 32 available bits are necessary and are consumed in implementing the rlwimi instruction 500, with no available bits to address floating point issues, to support SIMD, or provide increased generality and flexibility. As extensions for ISAs have developed over the years, however, one avenue for making the instruction more flexible has been overlooked: to use a register-based control word as a third operand. This avenue provides 32 bits (or 64 bits, in the case of 64-bit instructions) in place of the limited number of bits (15 for rlwimi) available as immediate arguments. These resources remain unharnessed, yet provide unrealized avenues for providing increased generality and flexibility in bit manipulation that can speed up code-critical calculations of elementary functions and contribute to other applications.

ISA extensions supporting SIMD, such as, without limitation, SSE, AVE, and ALTIVEC, break down barriers for the processing of floating point data inasmuch as much of the ISA extensions supporting SIMD provide instructions that can be applied on floating point data in the same way as they are applied on other forms of data. Floating point data, therefore, no longer need remain constrained within the confines of arithmetic operations, but can be processed with logical operations, which are more useful in manipulating bits. Therefore, several instructions can be defined to provide increased flexibility and generality in a SIMD or non-SIMD environment for floating-point data, or non floating point data, with these additional resources.

In one category of embodiments, for example, extra bits can be utilized to define a shift parameter 506 and first and second partition locators 508, 510, for each unit of input data 502 in a vector of multiple units of input data. At least two different types of embodiments fall within this category of embodiments. In one type of embodiment, the same shift parameter 506 and first and second partition locators 508, 510, for each unit of input data 502 in the vector of multiple units of input data are applied in different SIMD slots identically. In another type of embodiment, a different shift parameter 506 and/or first and/or second partition locators 508, 510 are applied in different SIMD slots.

In certain embodiments, additional bits can be used to encode a separate shift parameter 506 for different units of input data in the vector of multiple units of input data. Therefore, an instruction can be provided for an ISA, and/or ISA extensions, that allow for shift/rotation and insert bit manipulation capabilities in a SIMD environment. As a result, the speed of bit manipulation can be greatly increased by simultaneously manipulating bits from multiple units of data. Furthermore, by defining instructions for a SIMD environment capable of handling floating point data, these same bit manipulation capabilities can be extended to floating point data, which is important in the calculation of elementary functions.

Figure 6:
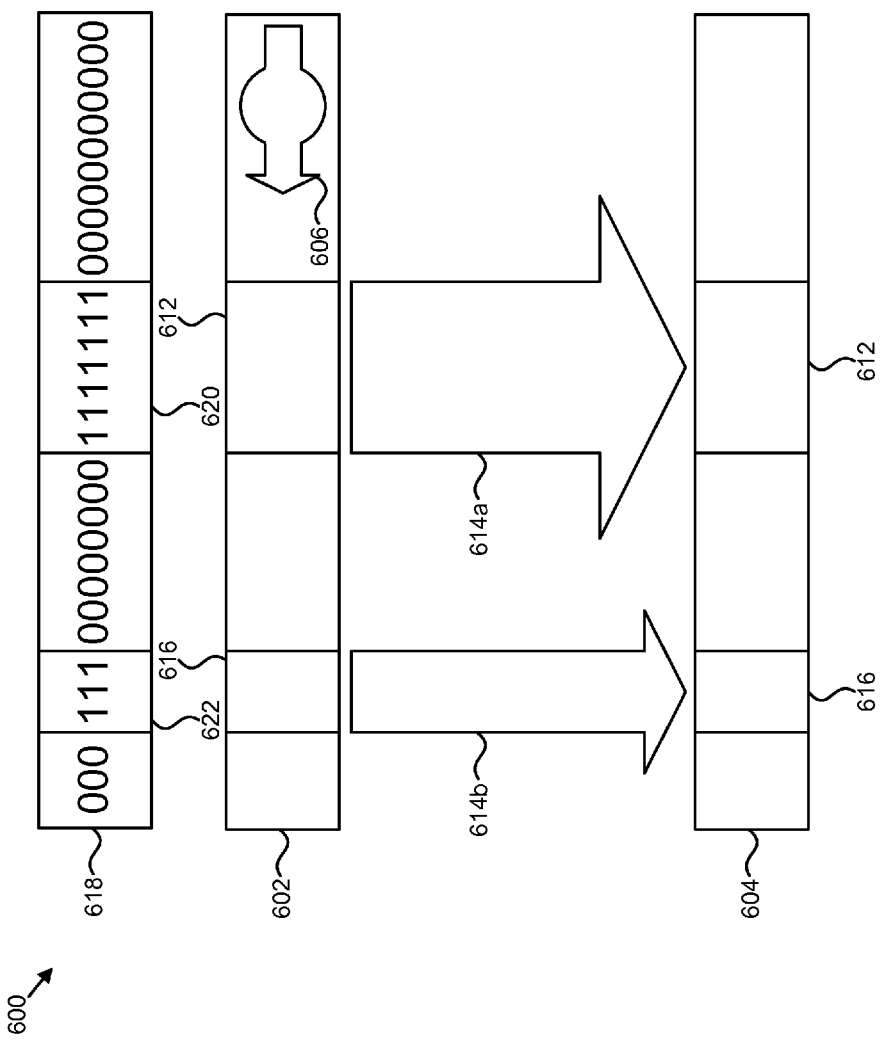
FIG. 6 is a high-level block diagram showing an implementation of a computer processor instruction in accordance with the invention.

Referring to FIG. 6, a block level diagram of an implementation of one example consistent with the invention and providing increased generality and flexibility in bit manipulation is depicted. A unit of input data 602 is depicted together with a unit of output data 604, which may reside in separate general purpose registers within a processor. Also depicted is a shift parameter SP 606 that indicates how far to shift/rotate bits from the unit of input data 602 to the left. Embodiments are also possible in which bits may be shifted/rotated to the right.

Unlike previous approaches to bit manipulation, multiple bit fields 612, 616, as opposed to a single bit field 512, from the unit of input data 602 may be defined for insertion 614a, 614b into the unit of output data 604. Each bit field designated for insertion from the unit of input data 602 may occupy the same relative position in the unit of output data 604. Other bit fields in the unit of output data 604 may remain unchanged. Although FIG. 6 depicts two bit fields 612, 616 designated for insertion, more bit fields may be designated for insertion in additional embodiments.

In certain embodiments, insertion 614a, 614b may be accomplished by masking. A register in which the unit of output data 604 resides may be under the control of a mask 618. The mask 618 may include at least a first bit field 620 and a second bit field 622 filled with ones corresponding to the positions of the first field designated for insertion 612 and the second field designated for insertion 616, respectively. All other bits may be zero. In such embodiments, the mask may be a register operand and the shift/rotate value an immediate operand. However, in alternative embodiments, the position of the ones and zeros may be inverted. Multiple bit fields can be defined, resulting in a non-contiguous bit pattern, as depicted. The position and length of a first bit field 620 may be determined by bits encoded in a new instruction. Similarly, the position and length of a second bit field 622 may be determined by additional resources, as discussed above, in the form of additional bits. Further bit fields may be determined in the same manner.

The ability to insert at least two bit fields has important implications for floating point data because a portion of the exponent bits of a floating point data unit can be selected together with a portion of fraction bits. The exponent bits and the fraction bits can play important roles in various elementary functions. For example, taking the base-2 logarithm function for a unit of floating point data may be accomplished by moving exponent bits to the fraction bits. Conversely, the exponent function may be accomplished by moving fraction bits to the position of exponent bits.

Figure 7:
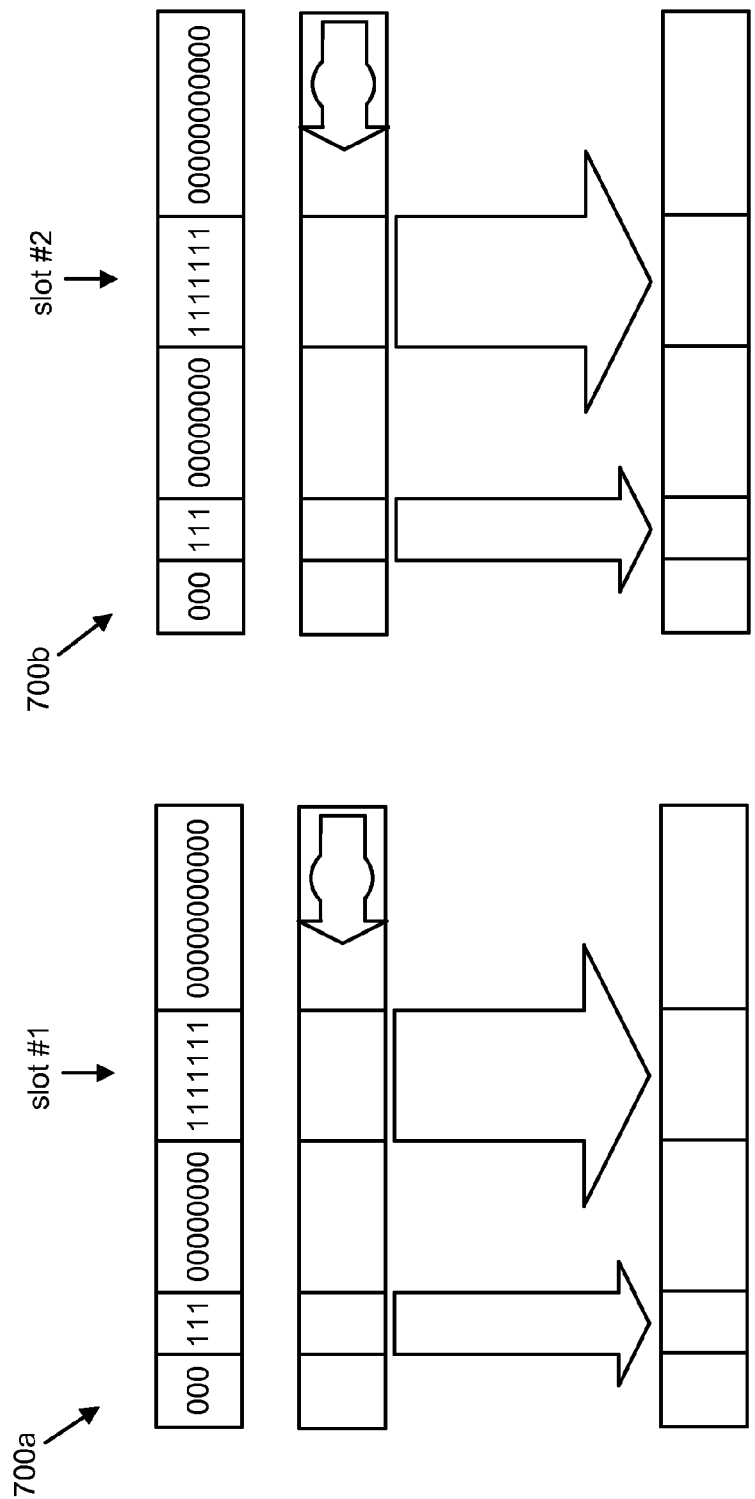
FIG. 7 is a high-level block diagram showing an implementation of a computer processor instruction in a parallel processing environment in accordance with the invention.

Referring to FIG. 7, a SIMD embodiment similar to the embodiments discussed with respect to FIG. 6 is depicted. Multiple different instances 700a, 700b, which may correspond to different SIMD slots, are depicted along the lines described above with respect to FIG. 6. Although only two instances 700a, 700b are depicted, more than two instances are possible, depending on the embodiment.

Instructions for such embodiments may use additional bit resources to encode a shift parameter 606 and multiple different bit fields designated for insertion, e.g., 612, 616, for each unit of input data in a vector of multiple units of input data. In certain embodiments, a shift parameter 606 and different bit fields designated for insertion, 612, 616, vary for different units of input data and in the vector of multiple units of input data, so that the value of a shift parameter 606 for one unit of input data is uncoupled from the value for another unit of input data. Such instructions may also be implemented in a SIMD environment in a way that also supports floating point data.

Figure 8:
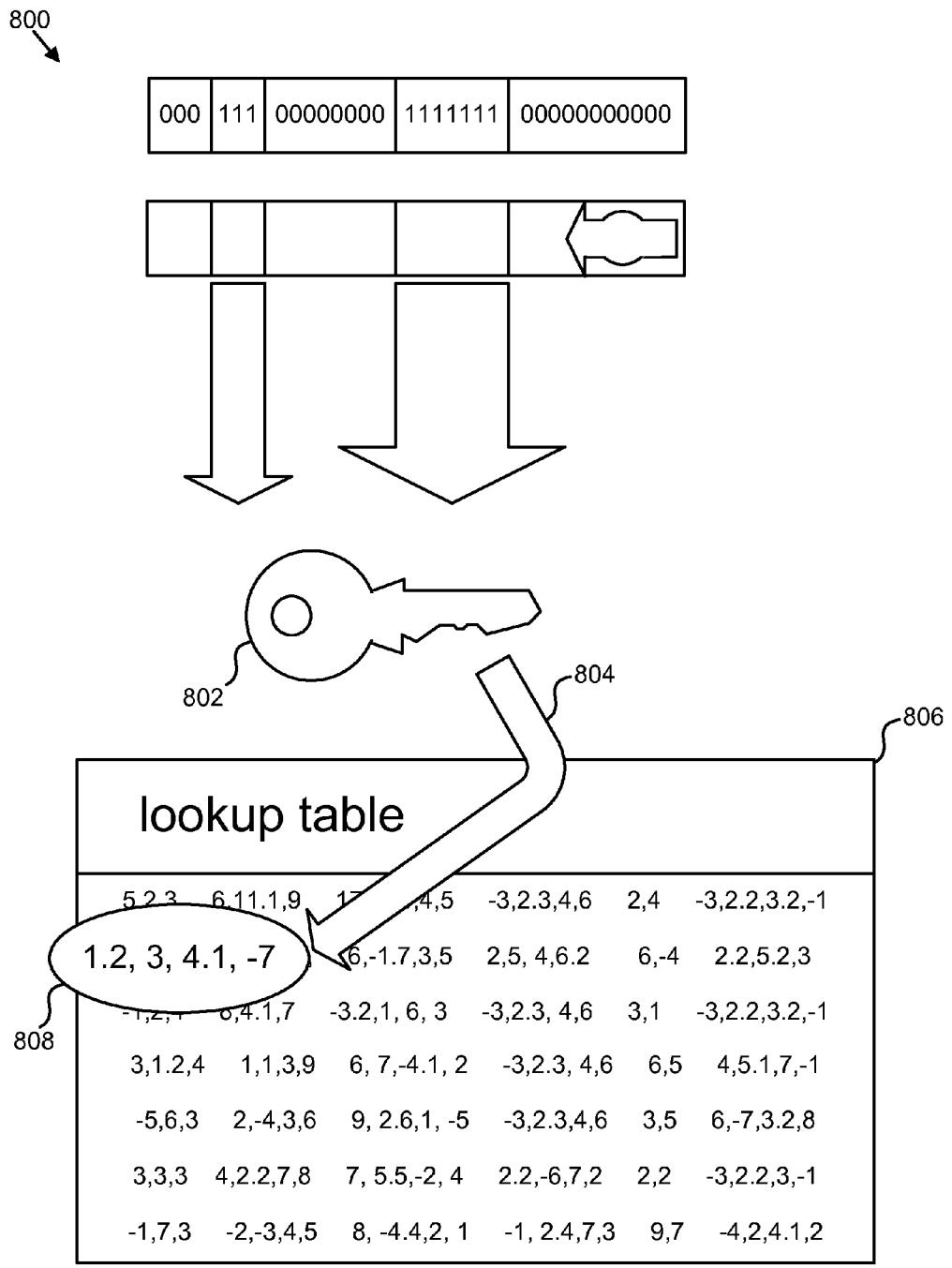
FIG. 8 is a high-level block diagram showing a more efficient process of bit-manipulation-based generation of a key used to access polynomial coefficients for a piecewise polynomial approximation of an elementary function in accordance with an example of a particular result to be accomplished by the invention.

Referring to FIG. 8, an instance 800 of bit manipulation based on an embodiment similar to those discussed with respect to FIG. 6 is depicted generating a key 802 used to access 804 a table of polynomial coefficients 806 is disclosed. In particular, the key 802 accesses 804 a particular set of coefficients 808. (The nature of the coefficients depicted in FIG. 8 is not intended to be limiting.) Although additional steps not depicted in FIG. 8 may be necessary to generate a key 802 suited for certain embodiments, the increased generality afforded by the increased number of bit fields—e.g., four at a minimum—in the embodiments discussed with respect to FIG. 6, will greatly tend to reduce steps and instructions, possibly to one.

Figure 9:
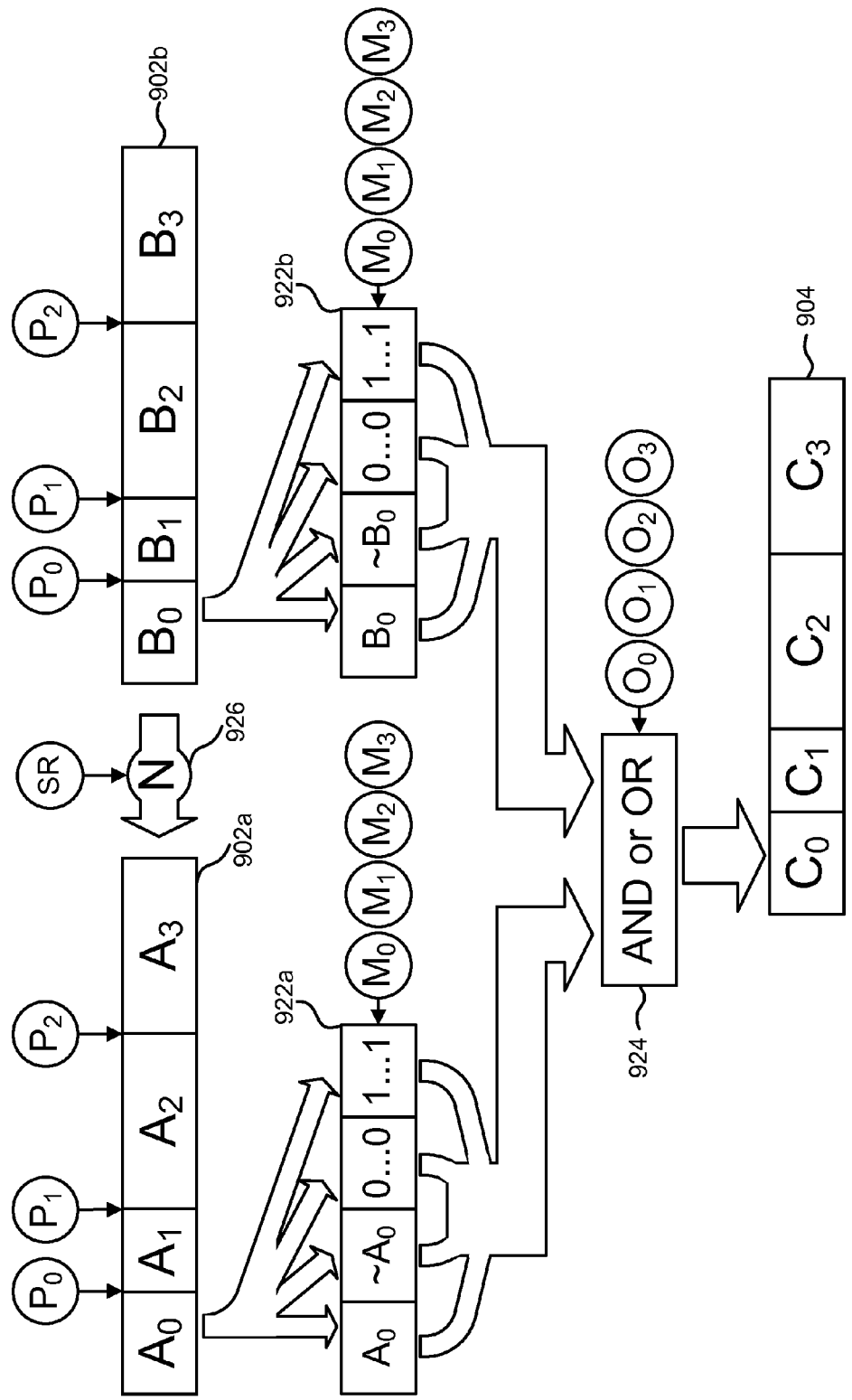
FIG. 9 is a high-level block diagram showing an implementation of a another computer processor instruction capable of even greater generality and flexibility with respect to bit manipulation in accordance with the invention.

Referring to FIG. 9, a block level diagram of an implementation of another example providing even greater generality and flexibility with respect to bit manipulation is depicted. The figure depicts two units of input data 902a, 902b, which may reside in two general purpose registers in a SIMD environment. Each unit of input data is partitioned into four different bit fields, $A_0$, $A_1$, $A_2$, $A_3$, $B_0$, $B_1$, $B_2$, and $B_3$, by three different partition points, $P_0$, $P_1$, and $P_2$.

In this embodiment, the partition points ($P_0$, $P_1$, and $P_2$) are located in the same positions with respect to the two units of input data 902a, 902b. Each partition point is encoded in a first series of bits in a new instruction with a number of bits for each partition point sufficient to describe a number of positions equal to a number of positions in the units of input data 902a, 902b. For example, for 32 positions, 5 bits may be used, but other numbers of bits for other numbers of positions are possible. In certain embodiments, more than three partition points are possible.

Each of the bit fields ($A_0$, $A_1$, $A_2$, $A_3$, $B_0$, $B_1$, $B_2$, and $B_3$) may be operated on by one of several (e.g., four) different possible bitwise, logical operations, such as a NOT operation ($\sim A_0$), a no change operation ($A_0$), a change to all zeros operation (0 . . . 0), and a change to all ones operation (1 . . . 1). Other logical operations are possible in other embodiments. The modulation may be accomplished by a first modulation module 922a and a second modulation module 922b corresponding to the first unit of input data 902a and the second unit of input data 902b.

A logical operation may be determined by a selection ($M_0$, $M_1$, $M_2$, $M_3$) encoded in a second series of bits in the new instruction with a number of bits sufficient to describe the number of different possible logical operations. In the embodiment depicted in FIG. 9, two bits may be used to describe four different operations. However, bits describing more than four operations are also possible. A selection may be encoded for each bit field created by the partition points. In certain embodiments, a single selection ($M_0$) determines the same logical operations for a pair of bit fields ($A_0$, $B_0$) corresponding to the same relative position from the two units of input data 902a, 902b.

In some embodiments, like the one depicted in FIG. 9, a series of selections ($M_0$, $M_1$, $M_2$, $M_3$) determines one of the possible logical operations for each pair of the partitioned bit fields ($A_0$ $B_0$, $A_1$ $B_1$, $A_2$ $B_2$, and $A_3$ $B_3$) from the first and second units of input data 902a, 902b. In other embodiments, two separate and unique series of encoded selections ($M_0$, $M_1$, $M_2$, $M_3$) is provided for the first unit of input data 902a and the second unit of input data 902b. Depending on the embodiment, the number of encoded selections varies with the number of bit field pairs, or bit fields.

After each of a pair of bit fields ($A_0$, $B_0$) has been operated on in accordance with one or more of the possible logical operations, the pair of bit fields ($A_0$, $B_0$) is combined in a combination module 924 according to another bitwise operation, which in embodiments consistent with those depicted in FIG. 9 may include one of an AND bitwise operation and an OR bitwise operation. In alternative embodiments, additional or alternative bitwise operations, such as XOR may be used.

The type of bitwise operation used to combine the pair of bit fields ($A_0$, $B_0$) may be determined by a combination selection ($O_0$) encoded in a third set of bits in the new instruction with a number of bits sufficient to cover the number of different possible logical operations possible to combine the pair of bit fields ($A_0$, $B_0$). In the table depicted in FIG. 9, only a single bit is needed to select either the AND bitwise operation or the OR bitwise operation, although more bits may be required for embodiments with additional bitwise operations used for combining the pair of bit fields ($A_0$, $B_0$). Once the pair of bit fields ($A_0$, $B_0$) has been combined, it occupies a position ($C_0$) in a unit of output data 904 similar to the ones occupied by the pair of bit fields ($A_0$, $B_0$) in the two units of input data 902a, 902b.

In certain embodiments, a series of combination selections ($O_0$, $O_1$, $O_2$, $O_3$) may be encoded in the new instruction for the various bit field pairs ($A_0$ $B_0$, $A_1$ $B_1$, $A_2$ $B_2$, and $A_3$ $B_3$) from the two units of input data 902a, 902b. The number of combination selections encoded in the new instruction may depend on the number of bit field pairs to be combined. Once the pairs of bit fields ($A_0$ $B_0$, $A_1$ $B_1$, $A_2$ $B_2$, and $A_3$ $B_3$) have been combined, they may occupy positions ($C_0$, $C_1$, $C_2$, $C_3$) in a unit of output data 904 similar to the ones occupied by the pairs of bit fields ($A_0$ $B_0$, $A_1$ $B_1$, $A_2$ $B_2$, and $A_3$ $B_3$) in the two units of input data 902a, 902b.

After each pair of partitioned bit fields ($A_0$ $B_0$, $A_1$ $B_1$, $A_2$ $B_2$, and $A_3$ $B_3$) has been combined, a unit of output data 904 is created, which may be stored in a general purpose register. In some embodiments, a shift or rotate operation 926 can be done on unit of input data A, 902a, (either to the left or right) before any of the other operations already described. The number of positions shifted or rotated, N, may be embedded in 5 (more or less) bits. A determination as to whether the operation is a shift operation 926 or a rotate operation is embedded in another bit, represented as (SR) in FIG. 9. Bits in input A 902a are either shifted by N bits or rotated by N bits, depending on the setting of the bit SR before the unit of input data A 902a is partitioned into A0, A1, A2, A3, according to P0, P1, P2. Other operations then proceed as discussed above.

Embodiments similar to those depicted in FIG. 9 may be implemented in SIMD environments where multiple pairs of units of input data 902a, 902b may be simultaneously processed to produce multiple units of output data 904. In certain embodiments, each pair of units of input data 902a, 902b may be processed in the same way. In other embodiments, different pairs of units of input data 902a, 902b may be processed differently using an instruction capable of encoding such differences. Furthermore, some SIMD embodiments may support logical operations on floating point data.

Figure 10:
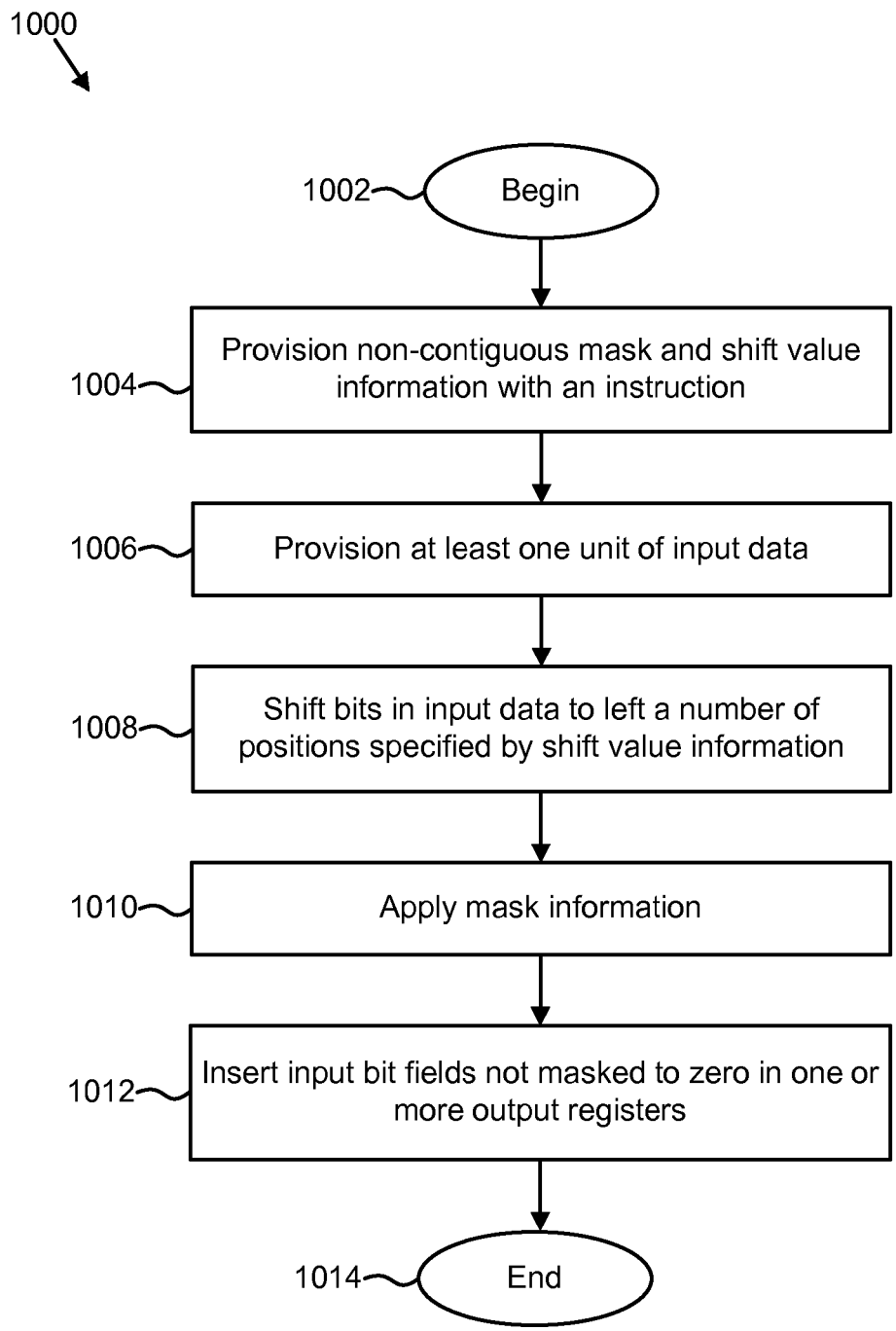
FIG. 10 shows one example of a method of bit manipulation consistent with the present invention.

Referring to FIG. 10, one embodiment of a process 1000 for increasing the generality and flexibility of bit manipulation, consistent with an aspect of the present invention, is depicted. The process 1000 begins 1002 by provisioning 1004 an instruction configured to apply a mask defining one or more contiguous bit fields, and a shift value (in alternative embodiments, this is a rotate value), on one or more units of input data. With respect to a single unit of input data, the corresponding mask may include multiple contiguous bit fields, with each bit field filled with either all ones or all zeros. The boundaries between the bit fields may be encoded in the new instruction.

At least one unit of input data is provisioned 1006 into at least one input register, which may be a general purpose register. The new instruction may include information for selecting the one or more units of input data. With respect to a single unit of input data, the process 1000 continues by shifting/rotating 1008 bits in the input register left (or right in other embodiments) a number of positions equal to a shift/rotate value provided with the instruction. In certain embodiments, bit positions left empty by the shifting process may be filled with either ones or zeros.

After the unit of input data has been shifted/rotated 1008, a corresponding mask may be applied 1010 and the bit fields not masked to zero may be inserted 1012 into an output register at the same positions occupied by the corresponding bit fields in an input register. Bit fields masked to 0 are not changed by the insertions and may remain the same. A unit of output data has been created, and the process 1000 ends 1014. In certain embodiments, the process 1000 may be implemented in a SIMD environment with multiple units of input data resulting in multiple units of output data. The process 1000 may also support floating point data in certain embodiments.

Figure 11:
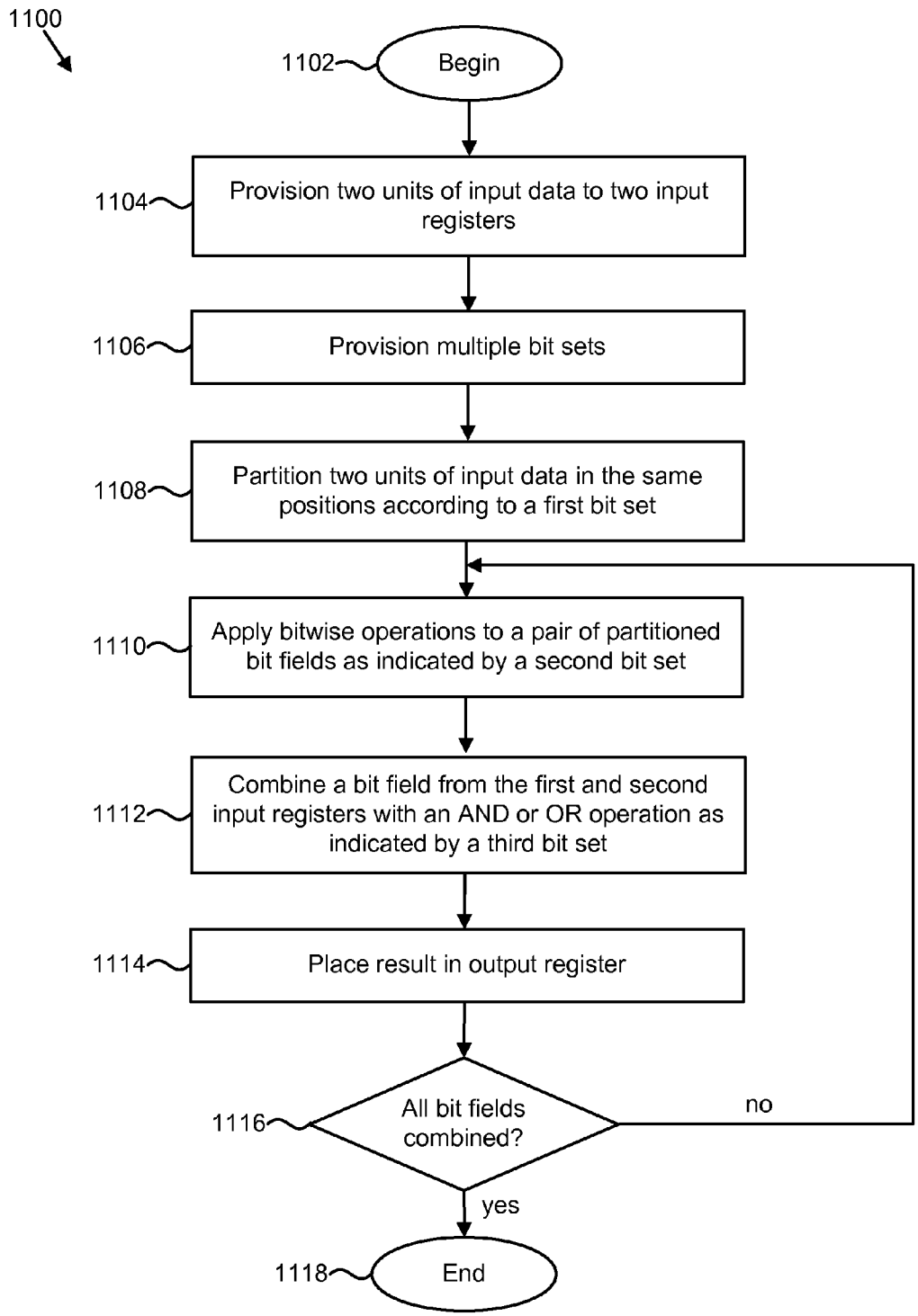
FIG. 11 shows another example of a method of bit manipulation consistent with the present invention.

Referring to FIG. 11, another embodiment of a process 1100 is depicted for further increasing the generality and flexibility of bit manipulation, consistent with an aspect of the present invention. The process 1100 begins 1102 by provisioning 1104 two units of input data to two input registers. The process 1100 continues by provisioning 1106 multiple bit sets in an instruction. A first set of bits in the instruction is used to similarly partition 1108 both units of input data at the same locations.

A second set of bits in the instruction is used to apply bitwise operations 1110, similar to those described above, to each partitioned bit field. The same or different operations may be applied to each pair of bit fields occupying the same positions in their corresponding units of input data. Once one or more operations are applied to a pair of bit fields, the process 1100 proceeds by combining 1112 the pair of bit fields from the first and second input registers with either an AND or an OR operation, as indicated by a third set of bits in the instruction. The result is placed 1114 in an output register.

A determination 1116 is then made as to whether another pair of bit fields remains in the first and second input registers for combination. If the answer is yes, the process 1100 continues by applying 1110 bitwise operations to the next pair of bit fields, combing 1112 them, and placing 1114 them in the output register. If the answer is no, the process 1100 ends 1118.

Figure 12:
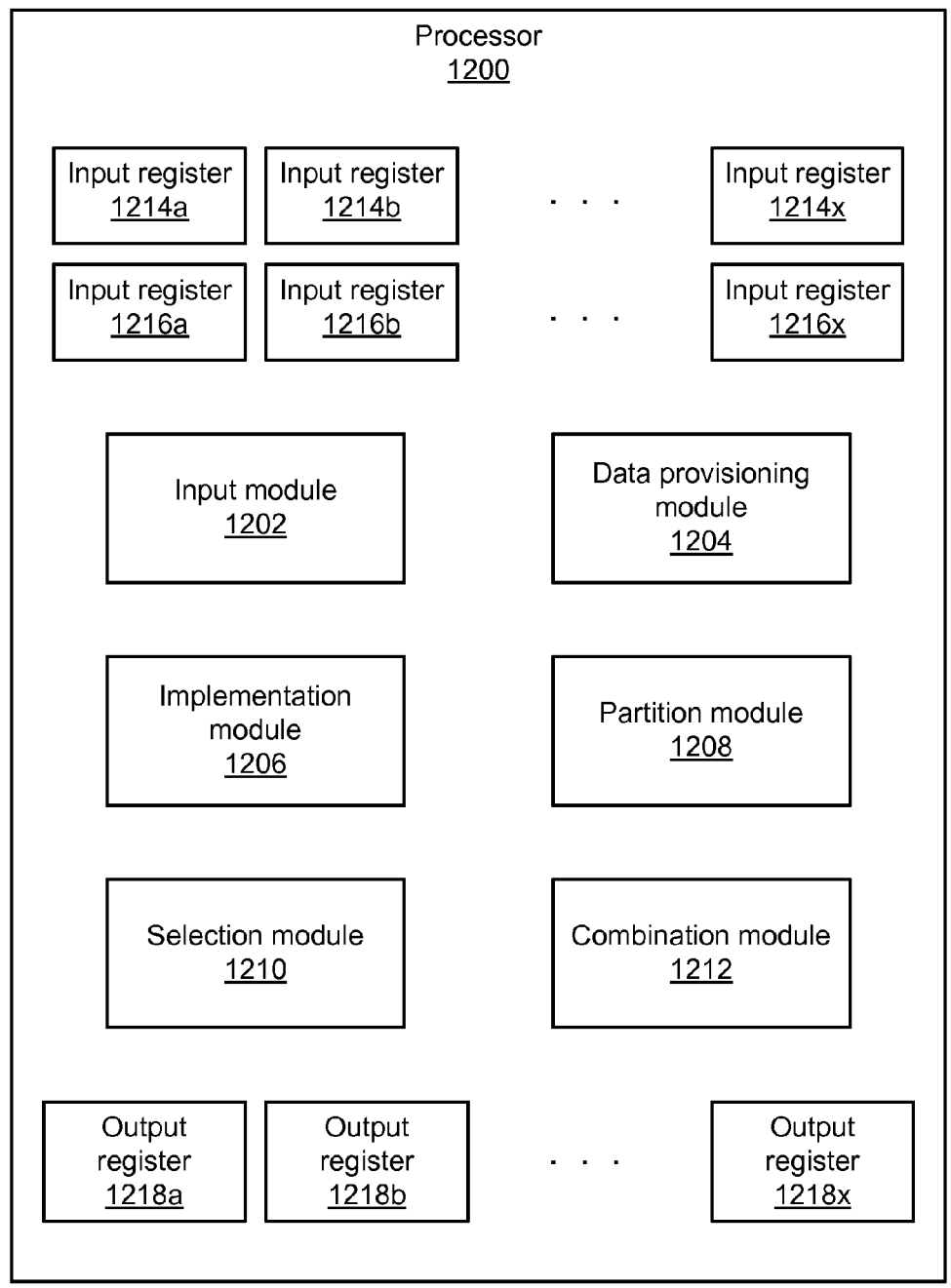
FIG. 12 is a high-level block diagram showing a computer processor with various modules and registers used in various embodiments of the present invention.

Referring to FIG. 12, a processor 1200 is depicted with elements used to implement various embodiments of the present invention. As appreciated, the processor 1200 may be a SIMD processor and/or a processor capable of performing logical operations on floating point data, or some other type of processor, such as a SISD or MIMD processor.

As shown, the processor 1200 includes an input module 1202 to provision input data. The processor 1200 also includes a data provisioning module 1204 to provision control data of various forms consistent with those discussed above. Also included is an implementation module 1206 to implement such instructions.

Certain embodiments may also include a partition module 1208 to read a first set of bits provided with the control data and indicating where to partition units of input data. Such embodiments may also include a selection module 1210 to select a bitwise operation for partitioned bit fields. Such embodiments may also include a combination module 1212 to combine a pair of bit fields from a first unit of input data and a second unit of input data using one of an AND operation and an OR operation.

As shown, the processor 1200 further includes multiple input registers 1214a-1214x, along the lines of input registers discussed above. In certain embodiments, a partner input register 1216a-1216x is provided for each of these input registers 1214a-1214x. For example, in the embodiment illustrated in FIG. 9, the partner input registers 1216a-1216x may receive the input data 902a, 902b after various operations have been performed thereon, but prior to combining the input data 902a, 902b using bitwise operations. The processor 1200 also includes several output registers 1218a-1218x along the lines discussed above.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. An apparatus for bit manipulation comprising:
   at least one input register within a computer processor;
   at least one output register within the computer processor;
   an input module configured to provision at least one unit of input data to the at least one input register;
   a data provisioning module configured to provision control data, wherein the control data is configured to provide information necessary to:
      partition the at least one unit of input data into a plurality of bit fields, where a length of a bit field is determined based on a capability of each bit in the bit field to be manipulated according to a common manipulation rule to achieve a particular result, and
      manipulate the plurality of bit fields in accordance with at least one manipulation rule to accomplish the particular result;
   an implementation module configured to:
      partition the at least one unit of input data into the plurality of bit fields in accordance with the control data, and
      manipulate each bit field in accordance with the control data to achieve the particular result in the at least one output register.

2. The apparatus of claim 1, wherein:
   the at least one input register comprises multiple input registers configured to store a vector of units of input data from the at least one unit of input data for parallel processing in a single instruction multiple data processor; and
   the implementation module is configured to implement the control data on the vector of units of input data to accomplish the partitioning and the manipulating steps on units of input data in the vector.

3. The apparatus of claim 2, wherein the implementation module is configured to generate multiple data sets within the control data, wherein a first data set is allocated to partition a particular unit of input data, and a second data set is allocated to manipulate resultant bit fields of the particular unit of input data in a manner uncoupled from how remaining units of input data from the vector are manipulated.

4. The apparatus of claim 1, wherein the implementation module receives mask information with the control data, the mask information comprising manipulation rules configured to insert non-contiguous bit fields of the at least one unit of input data stored in at least one input register into at least one output register.

5. The apparatus of claim 4, wherein the implementation module receives at least one shift parameter with the control data, wherein the at least one shift parameter defines a number of positions by which bits from the at least one unit of input data are shifted to one side.

6. The apparatus of claim 1, further comprising:
   a partner input register for each input register of the at least one input register;
   a partition module configured to read a first set of bits provided with the control data and indicating where to partition a first unit of input data and a second unit of input data from the at least one unit of input data into equally spaced bit fields;
   a selection module configured to select a bitwise operation constituting a manipulation rule from a set of bitwise operations for each bit field based on a second set of bits provided with the control data; and
   a combination module configured to combine a pair of bit fields from the first unit of input data and the second unit of input data with one of an AND operation and an OR operation based on a combination selection encoded in a third set of bits provided with the control data.

7. The apparatus of claim 6, wherein the set of bitwise operations includes at least one of a first bitwise operation that leaves bits unchanged in a bit field to which the first bitwise operation is applied, a second bitwise operation that performs a NOT operation on bits in a bit field to which the second bitwise operation is applied, a third bitwise operation that ensures that every bit has a value of zero in a bit field to which the third bitwise operation is applied, and a fourth bitwise operation that ensures that every bit has a value of one in a bit field to which the fourth bitwise operation is applied.

8. The apparatus of claim 7, further comprising multiple pairs of input registers configured to implement the control data on multiple pairs of a first unit of input data and a second unit of input data to produce multiple units of output vectors for multiple output registers concurrently in a single instruction multiple data processor.

9. A computer program product for bit manipulation, the computer program product comprising a non-transitory computer-readable medium having computer-usable program code for performing compiling functions embodied therein, the computer-usable program code comprising:
   computer-usable program code to compile a computer-usable program written in a programming language requiring compiling for implementation on a processor;
   computer-usable program code to identify portions of code, the processing of which could be done more efficiently through bit manipulation;
   computer-usable program code to determine partition points for units of input data to be processed by bit manipulation, wherein the units of input data are to be partitioned into a plurality of bit fields, where a length of a bit field is determined based on a capability of each bit in the bit field to be manipulated according to a common manipulation rule to achieve a particular result; and computer-usable program code to determine manipulation rules for the plurality of bit fields in accordance with at least one manipulation rule to accomplish the particular result.

10. The computer program product of claim 9, further comprising:

computer-usable program code to provision masking information derived from the manipulation rules, the masking information configured to insert non-contiguous bit fields of at least one unit of input data stored in at least one input register into at least one output register; and computer-usable program code to provision shift parameter information derived from the manipulation rules, wherein the shift parameter information defines a number of positions by which bits from a unit of input data are shifted to one side.

11. The computer program product of claim 9, further comprising:

computer-usable program code to provision bitwise operations derived from the manipulation rules to be performed on various bit fields;

computer-usable program code to provision combination selections derived from the manipulation rules, the combination selections configured to indicate one of an AND operation and an OR operation with which to combine pairs of bit fields from two units of input data.

* * * * *